Patented June 5, 1934

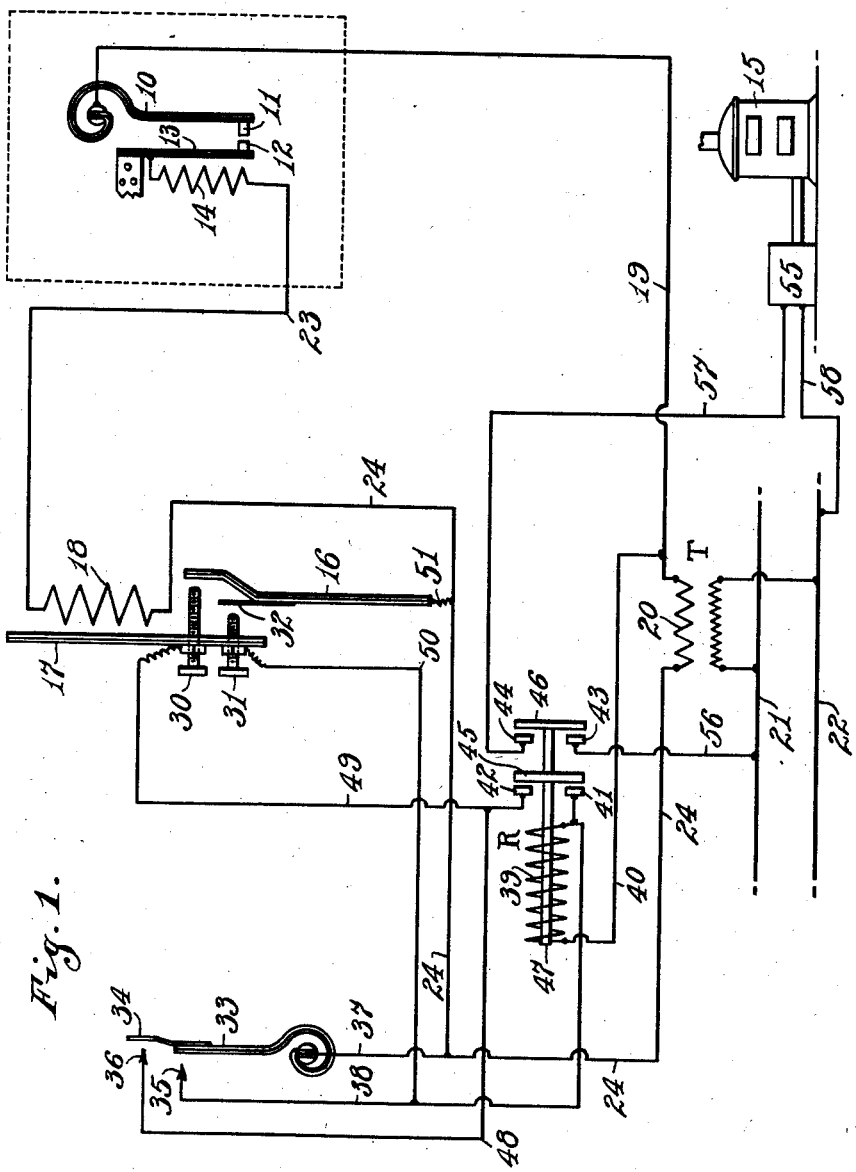

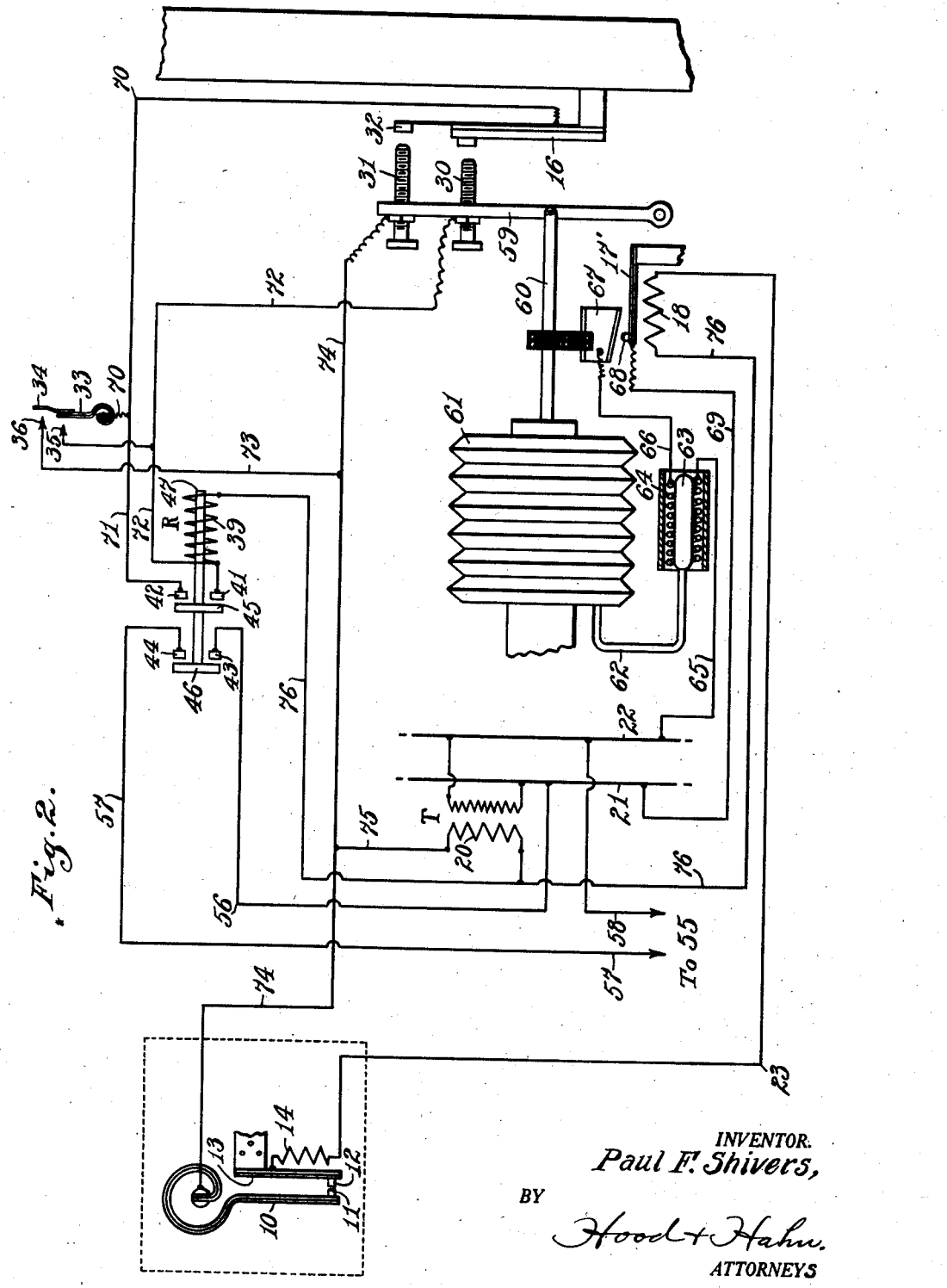

1,961,252

UNITED STATES PATENT OFFICE 1,961,252

LOW-LIMIT TEMPERATURE CONTROL

Paul F. Shivers, Wabash, Ind., assignor to Minneapolis-Honeywell Regulator Company, Minneapolis, Minn., a corporation of Delaware.

Application November 1, 1930, Serial No. 492,743
Renewed October 25, 1933

14 Claims. (Cl. 236—68)

The object of my invention is to produce a controlling device for a heat source, more particularly a heating furnace for a house, of such character that the heat delivery capacity of the heat source will be maintained at or above a predetermined low-limit of heat delivery capacity, by reason of the cooperative action of a thermostatic element subject to external atmospheric temperatures, a modulated positioning of an electrically-heated element modulated in its position in accordance with the position to which the external thermostat is urged by atmospheric temperatures, and an element, cooperating with said electrically heated element and responsive to current heat-delivery capacity of the furnace.

The accompanying drawings illustrate my invention diagrammatically.

Fig. 1 is a diagram of one embodiment of my invention embodying one type of electrically-heated element; and Fig. 2 is a diagram illustrating the embodiment of another type of electrically-heated element.

Referring first to Fig. 1, 10 is a thermostatic element intended to be placed in a position to respond to external atmospheric temperatures. This thermostatic element may be of any desired type and is illustrated in the drawings as of the well-known bi-metallic blade type, carrying an electric terminal 11. Arranged to cooperate with terminal 11 is a terminal 12 carried by a thermostatic element 13 (illustrated as of the bi-metallic blade type) preferably less responsive to heat changes than thermostat 10.

Associated with blade 13 is an electric heating coil 14. These parts are so arranged that terminal 12 will normally contact with terminal 11 at all positions assumed by said terminal 11 when the blade 10 is subjected to temperatures below a predetermined temperature, and blade 13 is not locally heated.

Arranged adjacent the furnace, or other heat source 15, and responsive to variations in its heat delivery capacity is an element 16 which, for convenience of illustration, is indicated as a bi-metallic thermostatic blade which is electrically-conductive and is responsive to temperature variations of the heat source. It is to be understood, however, that the element 16 may be any element responsive to variations in heat delivery capacity of a heat source, i. e., temperature, internal pressure, etc. For convenience the main heat source will be hereinafter referred to as a furnace.

Arranged to coact with element 16 is a thermostatic element 17 responsive to heat delivered by an electric heating coil 18, element 17 being illustrated as a bi-metallic thermostatic blade.

Terminal 11, through blade 10, is connected by a wire 19 with a source of electrical energy 20, indicated in Fig. 1 as the secondary of a transformer T the primary of which is connected to the power line 21, 22. One end of coil 14 is connected to terminal 12 through blade 13 and the other end is connected by a wire 23 with one end of coil 18, the other end of said coil being connected by a wire 24 with source 20.

Carried by blade 17, and insulated from each other are the two screw terminals 30 and 31, terminal 30 being arranged to contact with the main body of blade 16 and terminal 31 being arranged to contact, a little earlier than the contact between terminal 30 and blade 16, with a spring contact 32 carried by blade 16.

Arranged in one of the rooms to be heated by the furnace is a room thermostat 33 indicated as a bi-metallic thermostatic blade carrying a spring terminal 34. Arranged to contact with the main body of blade 33 is a terminal 35 and a terminal 36 is arranged to contact with terminal 34 a little in advance of the contact between the main body of blade 33 and terminal 35. A wire 37 is electrically-connected with terminal 34 and the portion of blade 33 which contacts with terminal 35 and connects with wire 24. A wire 38 leads from terminal 35 to one end of the coil 39 of a relay R, and a wire 40 leads from the other end of said coil to one end of the source 20. One terminal 41 of relay R is connected with one end of coil 39 and associated therewith is a terminal 42. The relay R is also provided with a second pair of terminals 43 and 44. Pairs of terminals 41—42 and 43—44 may be simultaneously bridged respectively by the bridge pieces 45 and 46 carried by the core 47 of the relay R. Terminal 36 is connected by wire 48 with terminal 42 and wire 49 connects terminal 30 with terminals 36 and 42 through wire 48. A wire 50 connects terminal 31 with terminals 35 and 41 through wire 38. Wire 51 connects terminal 32 and blade 16 with wire 24. Terminals 43 and 44 are in the energizing circuit of the control element 55 of any well-known character for controlling the heat-delivery capacity of the furnace, i. e., controlling the flow of current to an electric heater, or the delivery of fuel, or the adjustment of dampers, etc. Details of such control mechanism are well-known and are therefore indicated merely diagrammatically. A wire 56 therefore connects line 21 with terminal 43, and wires 57 and 58 lead respectively from terminal 44 and line 22 to the control element 55. The operation is as follows:

Blade 10, under the influence of external atmospheric temperature, at or below the minimum for which parts 10 and 13 are relatively adjusted, will assume a position contacting terminal 11 with terminal 12, thus closing the circuit 20, 19, 10, 11, 12, 13, 14, 23, 18, 24, 20 so as to energize coil 14 to cause the free end of blade 13 to move to the left terminal 12 being ultimately separated from terminal 11, thus permitting the coil 14 to cool. This same circuit likewise energizes coil 18 to cause the free end of the blade 17 to move to the right toward contact with the blade 16. Blade 10 coming to rest with terminal 11 at a predetermined point dependent upon the external atmospheric temperature, terminal 12, under the influence of coil 14, will intermittently contact with terminal 11, and coil 18 will be intermittently energized to maintain blade 17 heated so that it will be definitely positioned in accordance with the definite positioning of terminal 11.

Blade 16 moves toward terminals 30 and 31 upon decrease of heat-delivery capacity of the furnace and away from said terminals upon increase, and whenever the heat-delivery capacity of the furnace falls sufficiently terminal 32 will contact with terminal 31, thus closing the circuit 20, 40, 39, 38, 50, 31, 32, 16, 51, 24, 20, thus energizing relay R and bridging the terminal pairs 41—42 and 43—44, thus energizing the furnace through the circuit 57—58. The spring terminal 32 being quite light, yields promptly to permit the establishment of a holding circuit 20, 40, 39, 41, 42, 49, 30, 16, 51, 24, 20, for the relay.

The above-described circuits embodying the terminals 30, 31 and 32 and blade 16 are well known.

It will be seen from the above that energization of a furnace is obtained whenever a contact occurs between terminals 31 and 32 and that this contact will occur at a variable heat-delivery capacity of the furnace dependent upon the position of blade 17 which is determined by the positioning of terminal 11 under the influence of external atmospheric temperatures, the arrangement being such that as external atmospheric temperatures drop, the heat-delivery capacity minimum of the furnace will be correspondingly raised. As soon as the heat-delivery capacity of the furnace is raised to the desired minimum, dependent upon the external atmospheric temperature, the relay circuit through terminals 31 and 32 will be broken and further energization of the furnace through the medium of blade 16 will be discontinued. It will thus be seen that as external atmospheric temperatures drop, the furnace will be maintained at or above an increasingly higher minimum heat-delivery capacity so that, upon a call for further heat, by the room thermostat, the furnace will be capable of more promptly responding to such demand than would be the case either if no minimum, or a fixed minimum, of heat-delivery capacity were maintained in the furnace.

When room temperatures drop to or below a predetermined minimum blade 33 contacts with terminal 35, closing the circuit 20, 40, 39, 38, 35, 33, 37, 24, 20, energizing relay R to cause a closing of the holding circuit 20, 40, 39, 41, 45, 42, 49, 48, 36, 34, 33, 37, 24, 20, and a closing of the heat-energizing circuit through terminals 43 and 44 in the manner already described, these relay circuits being broken whenever blade 33 responds sufficiently to increased temperature in the room.

It will thus be seen that the heat-delivery capacity of the furnace will be increased either upon call for additional heat by the room thermostat or upon call for additional heat by the furnace-controlled element 16, each acting independently through relay R and that the call for furnace energization by the furnace will be modulated in accordance with external atmospheric temperatures.

The arrangement shown in Fig. 2 is identical with that shown in Fig. 1 as to parts similarly designated and differs therefrom primarily in the provision of a different type of thermostatic element for positioning the terminals 30 and 31. In this construction the terminals 30 and 31 are carried by a swinging arm 59 actuated by the stem 60 of an expansible and contractible bellows 61, the interior of which is connected by tube 62 with a capsule 63, the bellows and capsule containing an adequate quantity of a volatile fluid and capsule 63 being heated by a heater coil 64, one end of which is connected by wire 65 with line 22 and the other end of which is connected by wire 66 with a terminal 67 carried by and insulated from stem 60. The heater coil 18 is arranged to affect the bi-metallic thermostatic blade 17' which carries a terminal 68 arranged to coact with terminal 67 and terminal 68 is connected by wire 69 with line 21. Blade 17' in this arrangement is the element corresponding to blade 17 in the arrangement shown in Fig. 1, and is an element the position of which is modulated in accordance with the temperature position of terminal 11. The circuit connections in Fig. 2 are somewhat different from those shown in Fig. 1, but are such as to cause the corresponding parts to cooperate in the manner already described. Wire 70 connects blade 16 and terminal 32 with blade 33 and terminal 34 of the room thermostat, and a wire 71 connects wire 70 with terminal 42 of relay R. Wire 72 connects relay terminal 41 and one end of coil 39 with terminals 35 and 30. Wire 73 connects terminal 36 with blade 10 and terminal 31 through wire 74 which is connected by wire 75 with one end of the transformer secondary 20, and the other end of said secondary is connected to one end of coil 18 and one end of coil 39 through wire 76. Wires 57 and 58 lead respectively from terminal 44 and line 22 to the furnace control element 55 as in Fig. 1. Wire 23 connects one end of coil 14 with one end of coil 18.

In this construction heating of blade 17' by coil 18 drives terminal 68 toward terminal 67 and contact between said terminals closes the circuit 21, 69, 68, 67, 66, 64, 65, 22, causing the contents of capsule 63 to be heated and bellows 61 to expand to a point where 67 will be just withdrawn from 68, intermittent contact between 67 and 68 serving to hold terminal 67 in intimate association with terminal 68 no matter what the position of 68 may be under the influence of the average heat of coil 18, and thus serving to position terminals 30 and 31 in accordance with the position assumed by blade 17' under the heat action of coil 18. Decrease of temperature of blade 16, as before, causes contact between terminals 31 and 32 to cause energization of the furnace, and contact between the terminals of the room thermostat causes energization of the furnace in the manner previously described. Cooperation between terminals 11 and 12 under the influence of external temperatures modulates the range of activity of the element affected by furnace conditions, already described, so that when external temperatures rise above a predetermined maximum the furnace-affected control goes out of action, but the room thermostat retains control and is capable of effectively calling for heat. Under these conditions rapid heat response would not be of material importance.

I claim as my invention:

1. A furnace control mechanism for modulating the minimum heat-delivery-capacity of a furnace in accordance with conditions at a remote point, comprising a furnace-dominating element, a furnace-dominated element variably positioned in accordance with the heat-delivery-capacity of the furnace, an element dominated and variably positioned in accordance with conditions at a point remote from the furnace, an electric terminal carried by said last-mentioned element, a second electric terminal associated with the first terminal, a thermostatic element carrying said second terminal, an electric heater arranged to locally heat said thermostatic element to withdraw the second terminal from the first terminal, a second thermostatic element, a second electric heater arranged to locally heat said second thermostatic element, an energizing circuit for said electric heaters embodying said first and second terminals, an electrically actuated means dominating the furnace-dominating element, and means coordinated between said second thermostatic element and the furnace-dominated element for activating the furnace-dominating element when the heat-delivery-capacity of the furnace drops to a predetermined value.

2. A furnace control mechanism for modulating the minimum heat-delivery-capacity of a furnace in accordance with conditions at a remote point, comprising a furnace-dominating element, a furnace-dominated element variably positioned in accordance with the heat-delivery-capacity of the furnace, an element dominated and variably positioned in accordance with conditions at a point remote from the furnace, an electric terminal carried by said last-mentioned element, a second electric terminal associated with the first terminal, a thermostatic element carrying said second terminal, an electric heater arranged to locally heat said thermostatic element to withdraw the second terminal from the first terminal, a second thermostatic element, a second electric heater arranged to locally heat said second thermostatic element, an energizing circuit for said electric heaters embodying said first and second terminals, an electrically-actuated means dominating the furnace-dominating element, an energizing circuit for said electrically-actuated means and embodying coacting circuit-controlling elements dominated respectively by the furnace-dominated element and the second thermostatic element.

3. A furnace control mechanism for modulating the minimum heat-delivery-capacity of a furnace in accordance with conditions of a remote point, comprising an electrically-actuated furnace-dominating element, a furnace-dominated element variably positioned in accordance with the heat-delivery capacity of the furnace, an element dominated and variably positioned in accordance with conditions at a point remote from the furnace, an electric terminal carried by said last-mentioned element, a second electric terminal associated with the first terminal, a thermostatic element carrying said second terminal, an electric heater arranged to locally heat said thermostatic element to withdraw the second terminal from the first terminal, a second thermostatic element, an electric heater arranged to locally heat said second thermostatic element, an energizing circuit for said heaters embodying said first and second terminals, a relay, an energizing circuit for the electrically-actuated furnace-dominating element controlled by said relay, and an energizing circuit for said relay comprising elements dominated respectively by the second thermostatic element and the furnace-dominated element.

4. A furnace control mechanism for modulating the minimum heat-delivery-capacity of a furnace in accordance with conditions at a remote point, comprising an electrically-actuated furnace-dominating element, a furnace-dominated element variably positioned in accordance with the heat-delivery capacity of the furnace, an element dominated and variably positioned in accordance with conditions at a point remote from the furnace, an electric terminal carried by said last-mentioned element, a second electric terminal associated with the first terminal, an arm carrying said second terminal, an electric actuator associated with said arm and operable, when energized, to withdraw the second terminal from the first terminal, a second arm, an electric actuator operatively associated with said second arm, an energizing circuit for said actuators embodying said first and second terminals, a relay, an energizing circuit for the electrically-actuated furnace-dominating element controlled by said relay, and an energizing circuit for said relay comprising elements actuated respectively by the second arm and the furnace-dominated element.

5. A furnace control mechanism for modulating the minimum heat-delivery-capacity of a furnace in accordance with conditions of a remote point, comprising an electrically-actuated furnace-dominating element, a furnace-dominated element variably positioned in accordance with the heat-delivery capacity of the furnace, an element dominated and variably positioned in accordance with conditions at a point remote from the furnace, an electric terminal carried by said last-mentioned element, a second electric terminal associated with the first terminal, a thermostatic element carrying said second terminal, an electric heater arranged to locally heat said thermostatic element to withdraw the second terminal from the first terminal, a second thermostatic element, an electric heater arranged to locally heat said second thermostatic element, an energizing circuit for said heaters embodying said first and second terminals, a relay, an energizing circuit for electrically-actuated furnace-dominating element controlled by said relay, a third terminal actuated by said second thermostatic element, a third thermostatic element, a third electric heater for locally heating said third thermostatic element, and an energizing circuit for said relay comprising elements dominated respectively by said third thermostatic element and the furnace-dominated element.

6. An apparatus of the character specified in claim 1 comprising a room thermostat embodying means for energizing or deenergizing the furnace-dominating element.

7. An apparatus of the character specified in claim 2 comprising a room thermostat and means controlled by said room thermostat and embodied in an energizing circuit of the electrically-actuated means dominating the furnace-dominating element for closing and opening such circuit.

8. An apparatus of the character specified in claim 3 comprising a room thermostat comprising terminals for opening and closing an energizing circuit for the relay.

9. An apparatus of the character specified in claim 4 comprising a room thermostat comprising terminals for opening and closing an energizing circuit for the relay.

10. An apparatus of the character specified in claim 5 comprising a room thermostat comprising terminals for opening and closing an energizing circuit for the relay.

11. Furnace control mechanism comprising an electrical furnace-dominating element, an energizing circuit therefor, a switch in said circuit including two cooperating contact members each movable relative to the other, means responsive to conditions at a point remote from the furnace to variably position one of said contact members, means movable in response to variations in furnace conditions to variably position the other of said contact members, whereby said energizing circuit is controlled, a room thermostat remote from the furnace but responsive to variations in temperature in a region affected by variations in furnace temperatures, and a circuit controlled by said room thermostat and capable of energizing the furnace-dominating element independently of said switch.

12. Furnace control mechanism comprising an electrical furnace-dominating element, an energizing circuit therefor, a switch controlling said circuit, said switch comprising a movable member and a cooperating furnace dominated element, an element responsive to conditions at a point remote from said furnace, means associated with said condition-responsive element and with said movable member to cause variations in the position of said member in response to variations in the position of said condition-responsive element, said furnace-dominated element being movable in response to the heat-delivery capacity of said furnace, a room thermostat remote from the furnace but responsive to variations in temperature in a region affected by variations in furnace temperatures, and a circuit controlled by said room thermostat and capable of energizing the furnace-dominating element independent of said switch.

13. Furnace control mechanism comprising an electrical furnace-dominating element, an energizing circuit therefor, an element movable in response to conditions at a point remote from the furnace, a furnace-dominated element, a switch controlling said circuit, said switch comprising two cooperating members each movable relative to the other, one variably positioned in accordance with the position of said condition-responsive element, and the other variably positioned in accordance with the position of the furnace-dominated element, a room thermostat remote from the furnace but responsive to variations in temperature in a region affected by variations in furnace temperatures, and a circuit controlled by said room thermostat and capable of energizing the furnace-dominating element independently of said switch.

14. Furnace control mechanism comprising an electrical furnace-dominating element, an energizing circuit therefor, an element movable in response to conditions at a point remote from the furnace, an element movable in response to the heat-delivery capacity of said furnace, a switch controlling said circuit, said switch comprising two cooperating members each movable relative to the other one variably positioned in accordance with the position of said condition-responsive element, and the other variably positioned in accordance with the position of the element responsive to heat-delivery capacity of the furnace, a room thermostat remote from the furnace but responsive to variations in temperature in a region affected by variations in furnace temperatures, and a circuit controlled by said room thermostat and capable of energizing the furnace-dominating element independently of said switch.

PAUL F. SHIVERS.